United States Patent [19]

Hansen

[11] 4,384,979

[45] May 24, 1983

[54] CORROSION INHIBITOR

[75] Inventor: Gerald D. Hansen, Holecong, Pa.

[73] Assignee: Atlantic Richfield Company, Los Angeles, Calif.

[21] Appl. No.: 317,965

[22] Filed: Nov. 4, 1981

Related U.S. Application Data

[62] Division of Ser. No. 202,894, Oct. 31, 1980, Pat. No. 4,328,180.

[51] Int. Cl.$^3$ .................. C23F 11/16; C23F 11/12
[52] U.S. Cl. .................. 252/389 A; 210/697; 210/699; 210/700; 210/701; 210/765; 252/389 R; 252/396; 422/15; 422/16; 422/17; 422/18
[58] Field of Search .............. 252/389 A, 389 R, 396; 210/697, 699, 700, 701, 765; 422/15, 16, 17, 18

[56] References Cited

U.S. PATENT DOCUMENTS

| Re. 28,553 | 9/1975 | von Freyhold | 422/15 |
|---|---|---|---|
| 3,085,916 | 4/1963 | Zimmle et al. | 422/17 |
| 3,463,730 | 8/1969 | Booth et al. | 210/701 |
| 3,487,018 | 12/1969 | Troscinki | 422/15 |
| 3,578,589 | 5/1971 | Hwa et al. | 422/15 |
| 3,663,448 | 5/1972 | Ralston | 422/15 |
| 3,699,048 | 10/1972 | Kruegger et al. | 422/15 |
| 3,714,066 | 1/1973 | King et al. | 422/15 |
| 3,723,333 | 3/1973 | von Freyhold | 422/15 |
| 3,751,372 | 8/1973 | Zecher | 422/15 |
| 3,837,803 | 9/1974 | Carter et al. | 422/15 |
| 3,890,228 | 6/1975 | Hwa et al. | 210/699 |
| 3,935,125 | 1/1976 | Jacob | 422/15 |
| 3,965,028 | 6/1976 | O'Brien et al. | 210/701 |
| 3,992,318 | 11/1976 | Gaupp et al. | 422/15 |
| 4,029,577 | 6/1977 | Godlewski et al. | 210/701 |
| 4,048,065 | 9/1977 | Suen et al. | 422/15 |
| 4,101,441 | 9/1978 | Hwa et al. | 422/15 |
| 4,132,526 | 1/1979 | Schwarz et al. | 210/699 |
| 4,176,059 | 11/1979 | Suzuki | 210/697 |
| 4,209,398 | 6/1980 | Ii et al. | 422/15 |

FOREIGN PATENT DOCUMENTS 2513735 10/1975 Fed. Rep. of Germany ........ 422/15

Primary Examiner—Irwin Gluck

[57] ABSTRACT

The waters used for cooling generally contain hard ions of the group consisting of calcium and magnesium ions concentration of from about 10 to 600 parts per million. Such waters also contain bicarbonate ions. When cooling waters are recirculated through a cooling tower, they are saturated with oxygen and tend to be corrosive and tend to promote formation of calciferous scale. Such propensities are inhibited by the injection of appropriate chemicals so that the inhibited water contains dispersants effective in dispersing incipient calcium compounds and inhibiting calciferous scale, so that the inhibited water contains a plurality of components forming a dynamic layer on metal surfaces protecting such metal from oxidation. The inhibited water contains about 1 part per million of polyacrylic acid having a molecular weight of about 1,000 and terminated by thioglycolic acid, plus about 2 parts per million of dispersants comprising both sodium sulfonate dispersants and phosphate ester salt types of dispersants plus about 300 parts per billion of a mixture of organic phosphonates selected from the group consisting of diphosphonates, triphosphonates, tetraphosphonates and polyphosphonates, plus about 400 parts per billion of an aromatic trizaole, plus about 6 parts of added phosphate. The effluent from such cooling water has a sufficiently low concentration of toxic components to be suitable for discharge into some natural streams.

2 Claims, No Drawings

CORROSION INHIBITOR

RELATED APPLICATIONS

This is a compulsory division of Ser. No. 202,894 filed Oct. 31, 1980, now U.S. Pat. No. 4,328,180.

FIELD OF INVENTION

The present invention relates to the inhibition and prevent of corrosion of metal in contact with cooling water, which corrosion can be adequately controlled only if there is simultaneous prevention of calciferous deposits.

PRIOR ART

The useful life of steel and other metal components in a cooling water system is affected by the corrosiveness of the cooling water. The untreated cooling water can easily have a propensity for corrosion of mild steel at a rate of from 40 to 90 mils per year (mpy). Although efforts are sometimes made to seek corrosion rates as low as 1 mpy, the useful life of equipment is generally increased to a manageable range if the corrosion rate is kept as low as about 10 mpy.

It is important that the system for inhibiting the corrosion be adaptable to some of the variations of water composition attributable to the entrainment of acidic and/or alkaline dust and/or absorption of oxides of nitrogen attributable to thunderstorms in the area and other variables which complicate the inhibition of corrosion in cooling waters. Because the waters contain significant concentrations of oxygen, constantly resupplied as a result of the circulating areation of the cooling waters and because the cooling waters are heated to moderately high temperatures, the corrosion problems are significantly different from those dealing with deoxygenated water at ambient temperature.

Heretofore, it has been known that calciferous scale comprising calcium carbonate could form by heating water containing bicarbonate ions. Cooling waters sometimes contain measurable amounts of phosphate but the inclusion of appropriate concentrations of hexameta phosphate has been known to solubalize the hardness ions (calcium plus a minor amount of magnesium).

Zimmie et al U.S. Pat. No. 3,085,916 discloses the use of polyacrylic acid having a molecular weight of from 100,000 to 15,000,000 for dispersing calcium compounds for minimizing scale deposition.

Booth et al U.S. Pat. No. 3,463,730 discloses a copolymer of acrylic acid and acrylo amide having a molecular weight in the 1,000 to 8,000 range, which is employed to disperse calcium compounds and other scale forming components.

Troscinki U.S. Pat. No. 3,487,018 employs a chromium salt of an organic phosphate ester for dispersing calcium compounds. The reaction of ethylene oxide and/or propylene oxide with polyols such as mannitol, sorbitol, and the like provides polyalkoxylated polyhydroxy compounds which, after phosphoric esterification are reacted to form the chromium salt.

Hwa et al U.S. Pat. No. 3,578,589 employs the combination of a polyacrylic acid and a nonionic surfactant such as polyethoxy cetyl alcohol for dispersing the calcium compounds and/or other scale forming components. The polyacrylic acid should have a molecular weight in the 5,000 to 15,000 range.

Ralston U.S. Pat. No. 3,663,448 inhibits scale using from about 0.1 to about 100 parts per million of a composition comprising the combination of sodium amino tris (methylene phosphonate), and polyacrylic acid having a molecular weight of from 500 to 12,000.

King et al U.S. Pat. No. 3,714,066 describes corrosion inhibition using a diphosphonate of ethane preferably in combination with a 1,2,3 triazole such as tolyl triazole.

Von Freyhold U.S. Pat. No. 3,723,333 describes the inhibition of both corrosion and scale formation by the combination of two diphosphonic salts, one of them being a diphosphonic alkaline compound and the other being an amino derivative of an alkyl phosphonic acid.

Zecker U.S. Pat. No. 3,751,372 describes the combination of an inorganic polyphosphate and a polyfunctional acid polyphosphate or phosphate ester and a phosphonic acid such as 1-hydroxyalkyl disphosphonic acid.

Carter et al U.S. Pat. No. 3,837,803 describes the use of the combination of a single organo-phosphonic acid and a watersoluble orthophosphate compound in a ratio of from about 1 to 4 to about 4 to 1. A zinc salt is desirably employed in the formulation but nickel, cobalt, chromium, and cadmium are also effective modifiers of the composition.

O'Brien U.S. Pat. No. 3,956,028 describes method of inhibiting scale by using from 0.1 to 300 parts per million of an oligomer which may be a polyacrylate having from 4 to 250 preferably about 6 to 150 monomers in the polymer. The oligomer is one which has had the polymerization terminated by the use of bisulfite.

Godlewski U.S. Pat. No. 4,029,577 describes a polyacrylate copolymer copolymerized with a glycol ester of acrylic acid. The polymer must have a molecular weight of 500 to a million and be present in the concentration of from about 0.1 to about 500 parts per million.

Schwartz et al U.S. Pat. No. 4,132,526 describes a method of inhibiting the destructive effect of cooling water on asbeto-cement components of a cooling water system which involves the use of the combination of water soluble phosphate compounds and water soluble acrylate polymers.

Notwithstanding the extended research relating to the inhibition of corrosion and scale deposition there was no entirely satisfactory answer to the long felt need for an appropriate method of inhibiting corrosion and inhibiting scale in cooling water.

SUMMARY OF THE INVENTION

In accordance with the present invention, cooling water is inhibited so as to minimize corrosion by a method of treating such cooling water by controlling injection of additives, so that after such injection of additives, a million parts of cooling water contain: sufficient hydrogen ion to provide a pH within the range from about 6.5 to 8.2; from about 10 to 600 parts of hardness (Ca plus Mg cations); plus from about 3 to about 40 parts of a phosphate; plus from about 0.3 to about 3 parts of polyacrylic acid having a molecular weight of about 1,000, said polyacrylic acid being a thioglycolate terminated polymer; plus from about 0.1 to about 1 part of a mixture of a plurality of organic phosphonates of the group comprising diphosphonates, triphosphonates, tetraphosphonates, and polyphosphonates; plus about 0.6 to about 5 parts of dispersants comprising salts of both sulfonic acids and phosphate ester acids, the ratio of sulfonic to phosphate ester salts being within a range from about 1.5 to 1 to about 3 to 1;

plus from about 0.1 to about 10 parts of aromatic triazole; plus about 0.1 to about 10 parts of tartaric acid.

The nature of the invention is further clarified by reference to a plurality of examples.

EXAMPLE I

Acrylic acid is polymerized by providing a mixture of acrylic acid, a solvent, and a peroxide catalyst, and heating the mixture to a polymerization temperature, maintaining polymerization conditions for only a controlled period of time, and then injecting into the mixture a solution of thioglycolic acid to halt the polymerization at a controlled degree of polymerization. The thioglycolic acid terminates the polymerization and leaves a thioglycolate group at the end of the polymer. The range of molecular weights is relatively narrow so that it is possible to prepare a product from which there can be separated a fraction having a molecular weight of approximately 1,000 in which most polymer molecules have 9 acrylic acid units and in which substantially all of the molecules in the polymer are in the range from about 7 to 11 units. An important advantage of this polymer is that a 50% solution of the 1,000 molecular weight material has a relatively low viscosity so that it can be pumped and promptly mixed throughout the cooling water. Thus, the problems inherent in the utilization of high viscosity polymers are avoided. Moreover the 1000 m.w polymer is not readily degraded when recycled through the cooling water system, thus differing from some higher molecular weight polymers.

Dispersants which are alkali metal salts of sulfonic acids can be effective in dispersing precursors for scale and in inhibiting corrosion in the presence of appropriate corrosion inhibitors. Dioctyl (2 ethyl hexyl) maleate can be converted to the sulfonic acid derivative of the succinnic ester. The sodium salt of such succinic ester derivative having a sulfonic acid group on the 2 carbon atom has been used as a surfactant for many years. Such salt can be a very effective dispersant. Such a dispersant is believed to be available under trade marks such as Aerosol OT75. However, such dispersant is not readily dissolved and mixed with an aqueous solution. Accordingly, it is advantageous to dissolve the salt in an appropriate alcohol such as isoproproyl alcohol, and to add such solution to the aqueous system.

Tartaric acid can enhance the action of both the sulfonate dispersant and the polyacrylic acid dispersant. Morover, the tartaric acid is useful in solubilizing compounds of iron, nickel, etc. which might otherwise participate in scale formation.

A composition was prepared by mixing approximately 6% of the polyacrylic acid polymer having a molecular weight of about 1,000 and about 4% of the sodium sulfonate derivative of dioctyl ester of succinic acid. The sodium sulfonate derivative was dissolved in 3 parts of isoproproyl alcohol so that the composition included 16% of such solution for providing said 4% of the sodium sulfonate derivative of dioctyl ester of succinic acid. The composition contained 3% tartaric acid and 75% water. Said composition consisted of:

| | |
|---|---|
| water | 75% |
| polymer of acrylic acid, 1000 M.W. | 6% |
| tartaric acid | 3% |
| sulfonate dispersant | 4% |
| isopropyl alcohol | 12% |

| | |
|---|---|
| Total | 100% |

The composition was injected into cooling water at the rate of 20 parts per million so that it could combine with the phosphate composition also injected at a rate of about 20 parts per million. Such dilution corresponds to about 1 part of the composition which is injected per 50,000 parts of water.

A phosphate composition for use with the polyacrylate was prepared by mixing:

| | |
|---|---|
| sodium hydrogen phosphate | 24% |
| sodium tripolyphosphate | 4% |
| sodium sulfonate derivative of dioctyl ester of succinic acid | 2% |
| sodium amino tris (methylene phosphonic acid) | 1% |
| ethyleine diamine tetra (methylene phosphonic acid) | 0.5% |
| sodium salt of phosphate ester of tetra ethylene glycol | 12% |
| tolyl triazole | 3% |
| sodium hydroxide | 4% |
| ethylene glycol | 9% |
| water | 40.5% |
| Total | 100.0% |

The ethylene glycol is employed to permit the preparation of a solution of the tolyl triazole, which can then be dispersed in the remaining aqueous system.

This composition is injected at the rate of about 20 parts per million together with 20 parts per million of the polyacrylate solution so that the cooling water contains the following active ingredients:

| | Part per million |
|---|---|
| polyacrylic acid molecular weight 1000 M.W. | 1 |
| tartaric acid | 0.4 |
| sodium sulfonate derivative of dioctyl ester of succinic acid | 1.2 |
| sodium dihydrogen phosphate | 5 |
| sodium tripolyphosphate | 1 |
| sodium amino tris (methylene phosphonic acid) | 0.1 |
| ethylene diamine tetra (methylene phosphonic acid) | 0.2 |
| sodium salt of phosphate ester of tetra ethylene glycol | 1.0 |
| tolyl triazole | 0.4 |

The cooling water has a pH within the range from 6.5 to 8.2, and the concentration of calcium type ions is within a range from about 50 to about 600 ppm. The cooling water, after injection of said two solutions, is effectively protected so that there is not troublesome deposition of calciferous deposits and/or corrosion of the metal in the areas through which the cooling water flows. The method is advantageous by reason of its flexibility in adapting to the variations in the composition of the cooling water. The corrosion of mild steel in the aerated hot water containing said inhibitor combination is about 1 mpy, and well below the about 40 mpy which was measured for untreated water.

EXAMPLE 2

A series of tests were conducted in which the cooling water was inhibited for the control of corrosion and scale formation by the use of compositions similar to those described in connection with Example 1 but with modifications relating to the choice of phosphonate components. Thus it was established that there should be a mixture of plurality of the group consisting of diphosphonates, triphosphonates, tetraphosphonates and polyphosphonates. Some of the tetraphosphonates which were investigated and found to be suitable included the potassium salts of 1,1,4,4, tetraphosphonic acid butane, benzene-tetra (methylene phosphonic acid) and the tetraphosphonic derivate of neopentane. Diphosphonates and polyphosphonates can also be included in the mixture of phosphonates. The phosphonates having fewer phosphonate groups per molecule are desirably in a larger proportion than those having a larger number of phosphonate groups.

By series of tests it is established that phosphate ester dispersant may be either the sodium salt or the potassium salt. An acidic ester is formed by the reaction of 1 mole of alcohol with phosphoric acid and is thereafter neutralized with the stoichrometric equivalent of an aqueous solution of alkali hydroxide.

EXAMPLE 3

A phosphate composition is prepared for use with soft water, that is, water containing less than about 60 parts per million of calcium ion. Said composition consists of:

| | |
|---|---|
| water | 64% |
| sulfonate type of dispersant | 1% |
| sodium hexameta phosphate | 15% |
| tetra potassium pyrophosphate | 5% |
| organic triphosphonate | 1.5% |
| organic tetraphosphonate | 0.75% |
| potassium salt of cetyl ester phosphate | 6% |
| tolyl triazole | 2% |
| sodium hydroxide | 0.3% |
| ethylene glycol | 2% |

Said composition was injected into cooling water at the rate of about 25 parts per million together with the injection of the previously described polyacrylic acid solution at a rate of about 22 parts per million. The combination proved to be effective in inhibiting corrosion of metal as evidenced by the use of coupons of steel which were subjected to the treated cooling water over a period of several weeks without any trace of corrosion. However, in the absence of the inhibiting soulution, detectable amounts of corrosion were found during two weeks of partial immersion in the aerated cooling water.

By a series of tests it is established that the cooling water, after the addition of the two compositions from the two drums, should have a pH which is within a range from about 6.5 to about 8.2. It is generally desirable to try to keep the pH below about 8.0. As long as the pH is appropriately 7.1 to 8.2, the hexameta phosphate and pyrophosphates are able to function as the polyphosphate. However, when the pH of the water is in the 6.5-7 range there is a propensity for such polyphosphates to convert to the monophosphate condition. The combination of the polyphosphate, and/or monophosphate and the mixture of types of phosphonic acid provides appropriate inhibition of corrosion notwithstanding these variations in the condition of the polyphosphate.

Although the phosphate system and the polyacrylic acid system cooperate attractively in the cooling water, there are difficulties in an attempt to formulate a concentrated composition suitable for injecting into the cooling water at a rate of about 40 parts per million and containing both the polyacrylate and the phosphate. Accordingly, in accordance with the present invention, the two compositions are injected into the cooling water so that the mixing of the phosphate containing composition and the acrylate composition can occur subsequent to the significant dilution of the modifying chemicals.

By a series of tests, it is established that the cooling water should contain from about 10 to about 600 ppm of hardness cations of the group consisting of calcium and magnesium, and that it should contain the following components:

| | concentration range ppm |
|---|---|
| polyacrylic acid | 0.3-3.0 |
| tartaric acid | 0.1-1.0 |
| sodium sulfonate dispersant | 0.1-2.0 |
| mixture of plurality of diphosphonates, triphosphonates tetraphosphonates, and diphosphonates | 0.1-1.0 |
| phosphate ester dispersant | 0.5-3 |
| phosphate (mono, pyro, hexa, etc.) | 3-40 |
| aromatic triazole | 0.1-10. | said inhibited cooling water having a pH within the range from 6.5 to 8.2, said corrosion inhibition being attributable to the propensity of said treated cooling waters to form protective layers on metals contacted by said cooling waters, said protective layer comprising a dynamic equilibria mixture of several of said components, and said scale inhibition being attributable to control of pH, control of dispersant effectiveness, and control of relationships amongst bicarbonate phosphate and calcium ions, whereby any propensities for formation of insoluble calcium salts are regulated to be in the dispersed phase instead of forming calciferous scale.

The composition comprising polyacrylic acid should contain:

| | parts |
|---|---|
| polymer of acrylic acid, terminated by thioglycolic acid and a M.W. of about 1000 | 3-9 |
| tartaric acid | 1-8 |
| sodium sulfonate of dioctyl succinate | 1-10 |
| water q.s. for said solution to total | 100 | said solution being appropriate for injection so that one part of said solution is diluted into from about 10,000 to 100,000 parts of cooling water.

The composition comprising phosphate should contain:

| | parts |
|---|---|
| sodium hydrogen phosphate | 20-30 |
| sodium polyphosphate | 2-10 |
| sodium sulfonate of dioctyl succinate | 1-4 |
| mixture of phosphonic acids | 1-10 |
| salt of phosphate ester dispersant | 2-15 |
| aromatic triazole | 1-10 |
| sodium hydroxide | 1-6 |
| ethylene glycol | 0-10 |
| water q.s. for said solution to total | 100 | said solution being appropriate for injection into partially recirculating cooling water so that 1 part of said solution is diluted into from about 10,000 to 100,000 parts of cooling water.

Various modification are possible without departing from the scope of the appended claims.

I claim:

1. A composition suitable for injecting into cooling waters to inhibit metallic corrosion and to inhibit deposition of calciferous scale, said composition consisting essentially of:

|  | Parts |
| --- | --- |
| polymer of acrylic acid, terminated by thioglycolic acid and a M.W. of about 1,000 | 3–9 |
| tartaric acid | 1–8 |
| sodium sulfonate of dioctyl succinate | 1–10 |
| water q.s. for said solution to total | 100 | said solution being appropriate for injection so that one part of said solution is diluted into from about 10,000 to 100,000 parts of cooling water.

2. A composition suitable for injecting into cooling waters to inhibit metallic corrosion and to inhibit deposition of calciferous scale, said composition consisting essentially of:

|  | Parts |
| --- | --- |
| sodium hydrogen phosphate | 2–30 |
| sodium polyphosphates | 2–10 |
| sodium sulfonate of dioctyl succinate | 1–4 |
| mixture of phosphonic acids | 1–10 |
| salt of phosphate ester dispersant | 2–15 |
| aromatic triazole | 1–10 |
| sodium hydroxide | 1–6 |
| ethylene glycol | 0–10 |
| water q.s. for said solution to total | 100 | said solution being appropriate for injection into partially recirculating cooling water so that 1 part of said solution is diluted into from about 10,000 to 100,000 parts of cooling water.

* * * * *